(12) United States Patent
Nimberger et al.

(10) Patent No.: US 6,513,556 B1
(45) Date of Patent: Feb. 4, 2003

(54) FLEXIBLE HOSE PASSIVE SHUT DOWN SYSTEM

(75) Inventors: Spencer M. Nimberger, Houston, TX (US); Robert L. Ward, Missouri City, TX (US); Frank Gonzales, Houston, TX (US)

(73) Assignee: PGI International, Ltd., Houston, TX (US)

( * ) Notice: Subject to any disclaimer, the term of this patent is extended or adjusted under 35 U.S.C. 154(b) by 2 days.

(21) Appl. No.: 09/933,404

(22) Filed: Aug. 20, 2001

(51) Int. Cl.[7] ............................................. F16K 15/00
(52) U.S. Cl. ...................... 141/387; 137/522; 137/541
(58) Field of Search ............................... 141/387, 231; 137/522, 523, 540, 541, 463, 464, 465; 251/94, 251

(56) References Cited

U.S. PATENT DOCUMENTS

| | | | | |
|---|---|---|---|---|
| 3,027,912 A | * | 4/1962 | Carr et al. | 137/478 |
| 4,967,791 A | * | 11/1990 | Sternberger | 137/522 |
| 6,260,569 B1 | | 7/2001 | Abrams | |
| 6,308,753 B1 | | 10/2001 | Nimberger et al. | |

OTHER PUBLICATIONS

Three advertising sheets of Lifeline Technologies, Inc. entitled "Smart–Hose", admitted as prior art, dates of publication unknown.

Three sheets of Smart Hose Engineering Data—admitted as prior art.

* cited by examiner

*Primary Examiner*—Gregory Huson
*Assistant Examiner*—Peter deVore
(74) *Attorney, Agent, or Firm*—Browning Bushman, P.C.

(57) ABSTRACT

The flexible hose assembly 10 interconnects a portable tank and another tank for transmitting hazardous fluids. A back check housing 34 contains a valve member 56 and a seating surface 58 for closing off flow through the back check housing. A flexible hose 16 extends downstream from the back check housing, and a flexible sensing line 26 extends within the flexible hose downstream from the back check housing for transmitting fluid pressure to a piston 36. The piston 36 is axially movable between a locked and unlocked position, and when in a locked position maintains the valve member in the open flow position and when in the unlocked position allows the valve member to move to the closed position. A biasing member is provided for biasing at least one of the piston and valve members to the unlocked position.

20 Claims, 7 Drawing Sheets

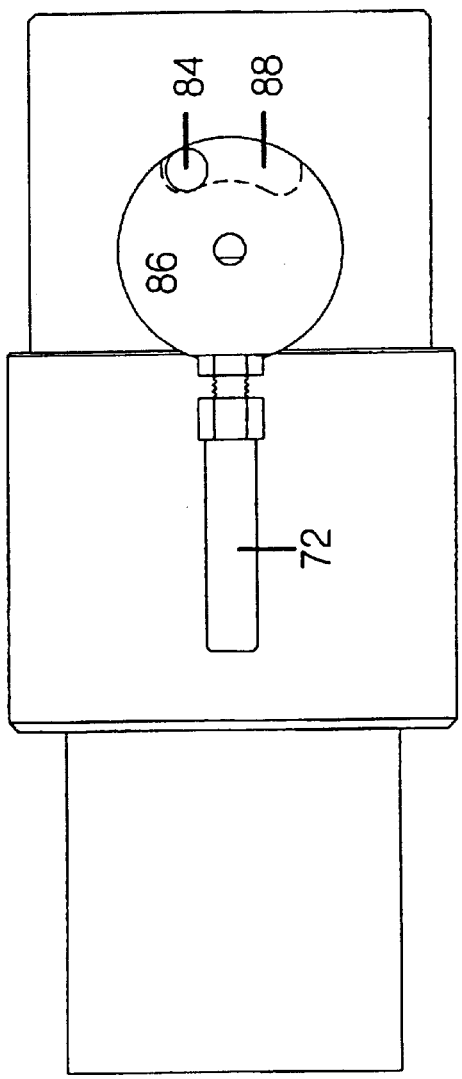
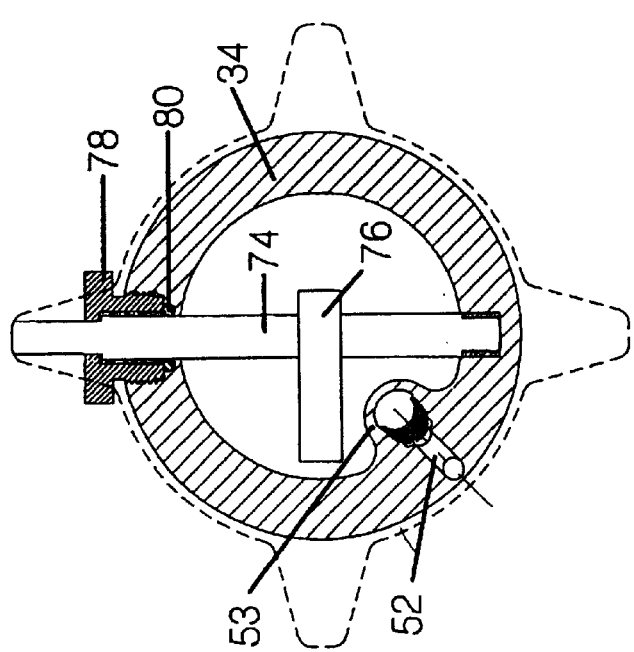

FLEXIBLE HOSE PASSIVE SHUT DOWN SYSTEM

FIELD OF THE INVENTION

This invention relates to a system which includes a flexible hose for transmitting hazardous materials. In a typical application, the hazardous material, such as propane or anhydrous. ammonia, is transmitted by the flexible hose system from a fixed storage tank to tank mounted on a roadway vehicle to a fixed storage tank.

BACKGROUND OF THE INVENTION

Various arrangements have been made for transferring hazardous materials between a portable roadway vehicle tank and a fixed storage tank. Since the release of the hazardous material could result in a life threatening situation, special precautions are taken to insure that little if any hazardous material is released to the atmosphere during transfer of the material along a flexible hose assembly that connects a fixed tank to the portable tank in the event of a complete hose failure. U.S. patent application Ser. No. 09/518,535 filed on Mar. 4, 2000 discloses an improved system for loading and unloading tanks containing hazardous fluids.

One of the drawbacks to the above system is that the system components involved in the transfer of the material between the tanks are located partially along the flexible hose which extends between the tanks, and partially on the vehicle or the portable tank connected to the vehicle. Accordingly, the system must be engineered for operating with various styles of trailers, and each variation must be certified by an engineer certified with the Department of Transportation or similar governmental agency. Since there are many styles of trailers and portable tanks, each variation much be tested to obtain certification, and the cost of these tests can be significant to the system developer. Also, the system must be inspected at installation by a certified governmental agency inspector, thereby further increasing the cost and inconvenience to the trailer owner.

One prior art system marketed by Smart-Hose Technologies, Inc. utilizes an internally coated cable which normally unseats valve members located at each end of the cable. In the event of hose separation, the valve members are released to stop the flow of product in both directions. The cable acts as a spring to maintain the valves off their seats, and the separation of the cable is intended to release the biasing force on the valves, which then move to the closed position. The biased cable which extends between the ends of the hose is installed with the hose during manufacture, so that the user must purchase the assembly which includes the hose. In addition, the operational integrity of the system cannot be readily confirmed, since there is no ability to check whether one of the valves has been frozen in the opened position. During handling and coiling of the hose, special care must be taken not to bend the hose and thus the cable over a sharp radius, or the cable will lose its ability to hold the valves open. If there is a failure of the hose, the entire system must be replaced, not merely the separated hose.

The disadvantages of the prior art are overcome by the present invention, and an improved flexible hose system for transmitting hazardous fluid, such as propane or anhydrous ammonia, is hereinafter disclosed.

SUMMARY OF THE INVENTION

The present invention uses a flexible hose system for transmitting hazardous fluid from a portable tank to a stationary tank or from a stationary tank to a portable tank, or between two portable tanks. Since all of the components are provided on the hose assembly and are not installed as a component of or secured to the trailer, the portable tank, or the fixed tank, regulations allow the hose assembly to be certified and then used by trailer operators regardless of the variation in the trailer or portable tank design. The hose assembly of the present invention thus need not be installed as a part of the trailer equipment, and rather is merely carried by the trailer operator and used during off loading or on loading independent of the equipment on the trailer. Accordingly, the flexible hose system may be certified one time by a certified governmental agency engineer, and the system need not be inspected by a certified governmental inspector at installation time.

It is an object of the present invention to provide an improved flexible hose assembly for interconnecting a portable tank with either a stationary tank or another portable tank when transmitting hazardous fluids between the tanks. The hose assembly includes a back check housing containing a valve and a seating surface, with the flexible hose extending downstream from the back check housing. The piston interconnected with the back check housing is axially movable between a locked position and an unlocked position, and is responsive to fluid pressure in a flexible sensing line which extends downstream from the back check housing within the hose. Fluid pressure in the hose is thus transmitted through the sensing line to move the piston to the locked position, thereby maintaining the valve member in the back check housing in the open position.

It is a further object of the invention to provide an improved method of interconnecting a portable tank with another tank, wherein pressure in a downstream portion of a flexible hose is used to maintain a piston in a locked position, which thereby maintains a valve member in the back check housing in the open flow position. Product flow may be initiated by manually moving the valve member to the open flow position, and then releasing the valve member only after the pressure in the flexible hose is sufficient to maintain the piston in the locked position.

It is a feature of the invention that a check valve be positioned within a downstream portion of the flexible hose assembly for preventing fluid flow back through the flexible hose.

It is a further feature of the invention that the valve member may be biased closed both by fluid being transmitted through the flexible hose assembly and by a spring which biases the valve member toward engagement with the seat.

It is a further feature of the invention to utilize a plurality of ball members for cooperating with the piston to maintain the valve member open when the piston is in the locked position and for allowing the valve member to move to the closed position when the piston is in the unlocked position.

A significant feature of the present invention is that the flexible hose system does not include components installed on either the portable vehicle or the stationary tank. Since all of the components of the flexible hose system are part of the system which interconnects the conventional components provided on both the portable tank and the stationary tank, the flexible hose assembly may be certified as an assembly and then merely carried by the operator for use during loading and unloading.

A significant advantage of the present invention is that the flexible hose assembly is relatively economical to manufacture, is highly reliable, and avoids the cost of interconnecting system components with either the portable tank or the stationary tank. The invention also utilizes a conventional flexible hose, which the user may already have.

These and further objects, features, and advantages of the present invention will become apparent from the following detailed description, wherein reference is made to the figures in the accompanying drawings.

BRIEF DESCRIPTION OF THE DRAWINGS

FIG. 3 is a cross-sectional view of FIG. 1 downstream from the manual lever shaft.

FIG. 4 is a simplified top view of the assembly shown in FIG. 2.

DETAILED DESCRIPTION OF PREFERRED EMBODIMENTS

Figure 1:
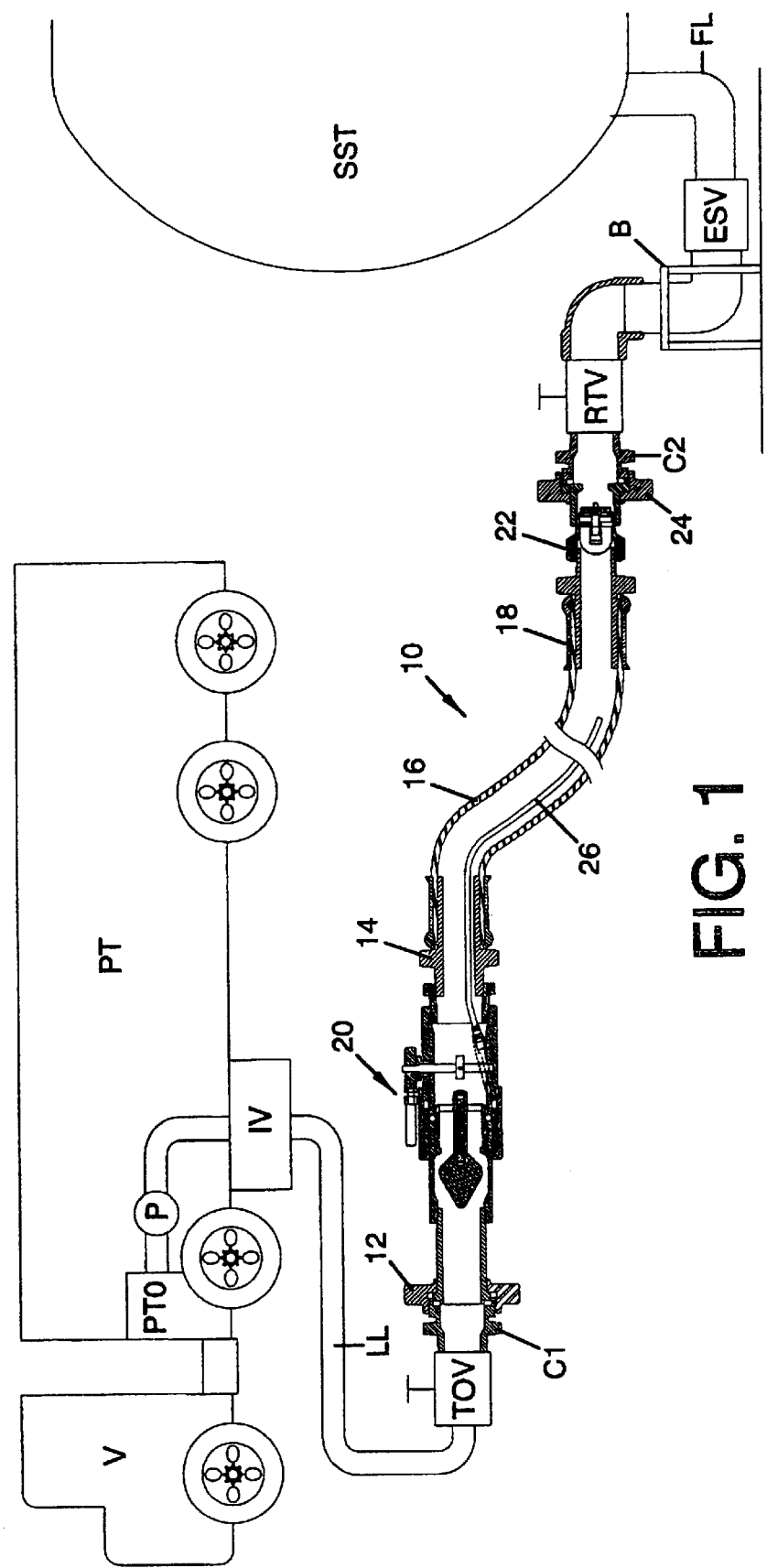
FIG. 1 is a simplified pictorial view of a flexible hose system according to the present invention for transferring material from a tank on a portable vehicle to a stationary storage tank.

FIG. 1 depicts a flexible hose system 10 according to the present invention used for transmitting hazardous fluids between a stationary storage tank and a portable tank carried by a vehicle. For the embodiment depicted in FIG. 1, the portable tank PT carried by the vehicle V is conventionally provided with an internal valve IV along a liquid line LL which terminates at transport outlet valve TOV. The internal valve, liquid line, and transport outlet valve are thus conventional components provided with a portable transport tank. At the opposite end, the stationary storage tank SST is provided with a fill line FL supported on a bulkhead B. A receiving tank valve RTV and a safety valve ESV are provided. along the fill line FL to the stationary storage tank. Flexible hose assembly 10 is thus provided between connector C1 immediately downstream from the transport outlet valve to the connector C2 immediately upstream from the receiving tank valve. The flexible hose system includes a conventional hammer union 12 which as shown in FIG. 1 is coupled to connector C1 in a fluid tight engagement. The back check assembly 20 is discussed in further detail below. A conventional adapter 14 connects the upstream end of the flexible hose 16 with the back check assembly, and a similar downstream adapter 18 connects the hose 16 with the back check valve 22, which in turn is connected to hammer union 24 which is coupled to the connector C2.

It is an important feature of the present invention that the flexible hose assembly includes a back check. A suitable back check valve according to the present invention is disclosed in U.S. application Ser. No. 09/518,535 hereby incorporated by reference. The back check valve 22 is desired within the flexible hose system since the operator generally cannot depend on the fill line to the storage tank SST having a back check installed. Also, some fill lines FL to a stationary storage tank are used both as inlet fill lines and withdrawal lines, and in that case the fill line FL practically cannot have a back check installed along that line. Those skilled in the art will appreciate that the flexible hose 16 could typically be in excess of 12 feet in length, and typically would be approximately 20 feet in length.

The back check assembly 20 is positioned along the flexible hose system in a manner opposite to its normal orientation to the flow of product through the flexible hose system. As discussed further below, a piston within the back check assembly is biased to the locked position by fluid pressure in the flexible hose 16. More particularly, the back check assembly 20 is preferably provided adjacent the inlet end of the flexible hose system, and the piston is retained in the locked position by fluid pressure that passes through a pressure sensing line or tube 26 which is open to pressure in a downstream end of the flexible hose system.

Figure 2:
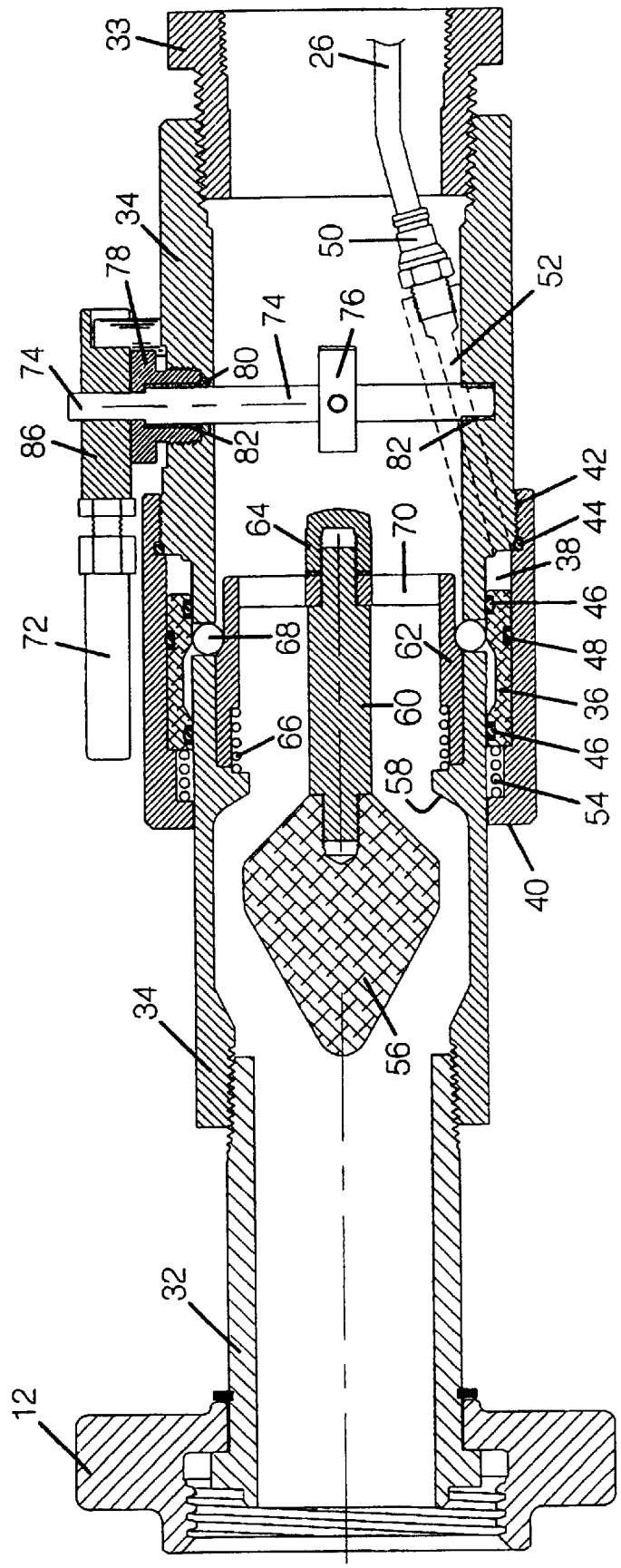
FIG. 2 is an enlarged cross-sectional view of a back check assembly generally shown in FIG. 1.

Referring to FIG. 2, a conventional connector 32 provides fluid communication between hammer union 12 and the back check housing 34. The piston 36 is movable within chamber 38 formed between the housing 34 and the locking collar 40, which is connected by threads 42 to the housing 34 and sealed therewith by O-ring 44. Piston 36 includes a pair of ID seals 46 each for sealing with the housing 34 and an OD seal 48 for sealing with the locking collar 40. Pressure sensing tube 26, which has its open end preferably positioned in the downstream portion of a flexible hose assembly and ideally closely adjacent the downstream end of a flexible hose assembly, is connected with fitting 50 to flow passageway 52 in the housing 34, thereby providing fluid communication between the chamber 38 and the interior of the downstream portion of the hose 16. As shown in FIGS. 3 and 4, the passageway 52 between the chamber 38 and the fitting 50 is preferably a single axis passageway to reduce manufacturing costs, and the housing 34 preferably includes a radially inward projection 53. As shown in FIG. 2, the single axis passageway 52 is behind the stem 74.

A biasing member such as a coil spring 54 biases the piston 36 to the unlock position. As shown in FIG. 2, pressure within the flexible hose assembly is thus transmitted to the chamber 38 to hold the piston in the locked position, so that the valve member 56 is held unseated from the seating surface 58. The valve member 56 is positioned on a valve stem 60, which in turn is connected to a ported sleeve 62 by threaded retaining cap 64. A biasing member such as a coil spring 66 biases the valve member 56 to the closed position, but the valve member is held open by a plurality of circumferentially spaced ball members 68 since the piston 36 is in the locked or open flow position.

When the back check assembly is in the open flow position, fluid thus flows around the valve member 56 and through the ports 70 provided in the sleeve 62, and then continues downstream through the flexible hose assembly. FIGS. 2, 3, and 4 also depict a manually operated handle 72 which may be used to rotate actuator shaft 74 which includes a cam member 76 affixed thereto. Threaded bushing 78 structurally connects the shaft 74 to the housing 34, and fluid tight engagement is provided by O-ring 80. Sleeves 82 may optionally be provided between the shaft 74 and both the bushing 78 and the housing 34 to reduce friction and facilitate rotation of the shaft 74 with respect to the housing 34. A pin or stud 84 limits travel of disk plate 86 within slot 88, thereby limiting rotation of the shaft 74, as explained subsequently.

Figure 5:
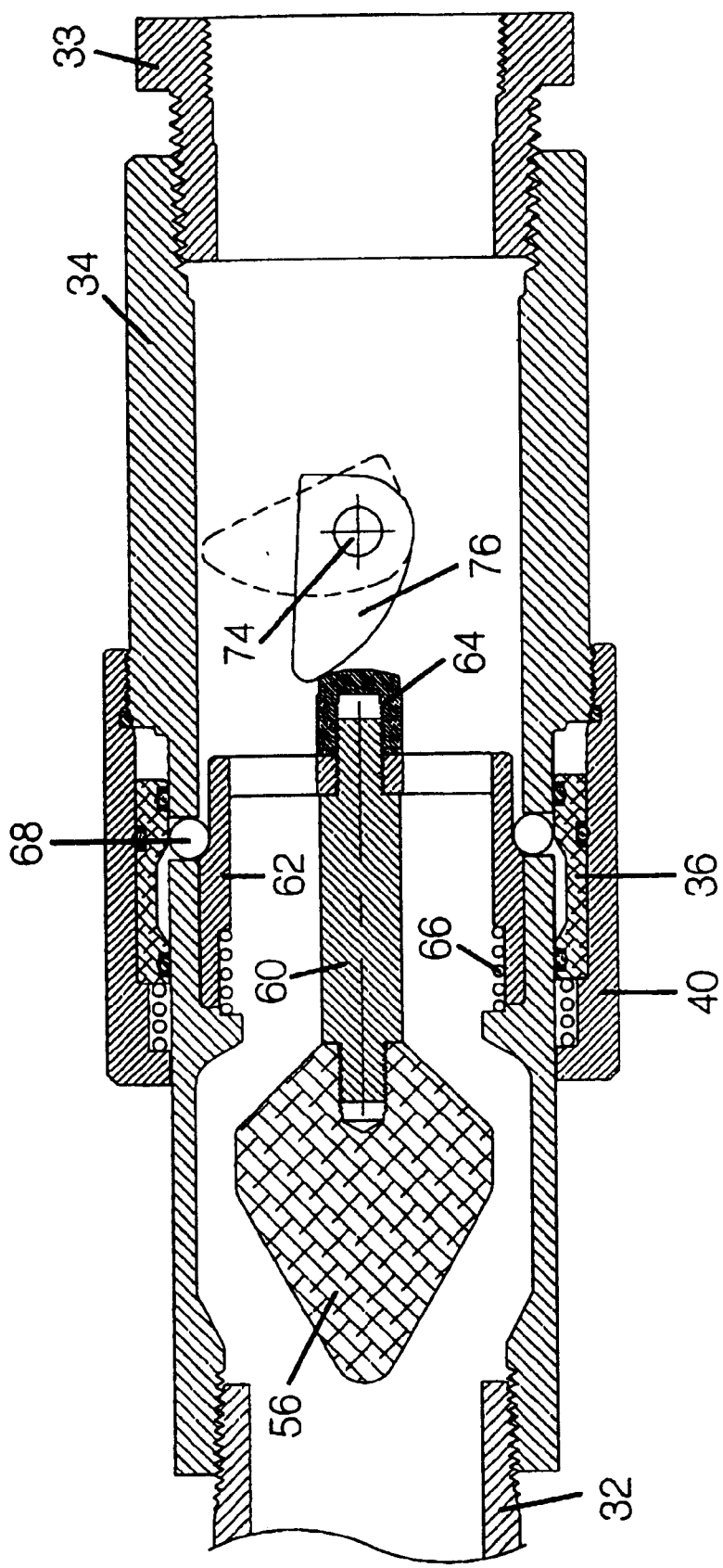
FIG. 5 is cross-sectional view of the back check assembly with the lever cam holding the back check assembly in the open flow condition.
Figure 6:
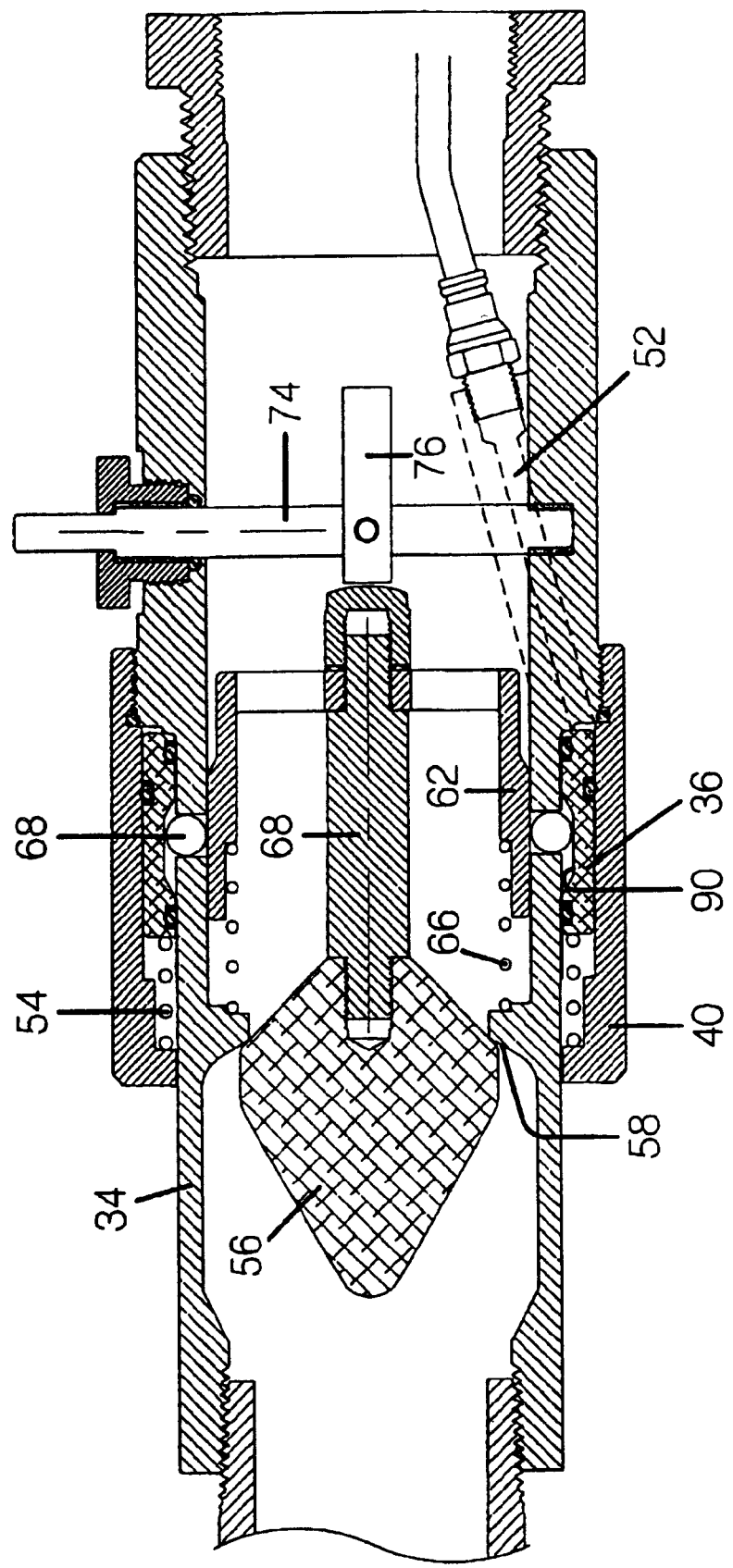
FIG. 6 is a cross-sectional view of the back check assembly in the closed position.

During normal operation, i.e. when the flexible hose system is being used for unloading fluid from the portable tank to the stationary storage tank, the pressure in the flexible hose maintains the piston 36 in the locked position to hold the back check assembly open. In order to initiate flow, the operator may manually rotate the handle 72 as shown in FIG. 5 to force the cam 76 against the retaining cap 64 and thereby overcome the biasing force of the spring 66 to open the back check assembly. While holding the back check assembly open with the cam 76, the transport outlet valve TOV may be opened to introduce system pressure to the transport hose 16, which then moves the piston 36 to a locked position as shown in FIG. 5, thereby allowing the operator to release the manual operating lever 72. The position of the piston 36 and the radial movement of the circumferentially spaced balls 68 lock and unlock the valve member 62. Accordingly, the flexible hose system is opened and the power take off PTO on the portable transport can be engaged to activate pump P to pump fluid through the flexible hose assembly and to the stationary storage tank. In the event of a hose separation, downstream pressure in the hose, and thus the pressure which is exposed to the sensing tube 26, will drop below a selected locking piston set pressure, thereby moving the piston 36 to an unlocked position, as shown in FIG. 6, and thus allowing the balls 68 to move radially outward into the recessed area 90 within the piston 36, thereby unlocking valve member 62. The valve 56 is thus biased to its closed position both by the force of the product flow acting on the valve member 56 being upstream of seat 58, and by the biasing action of the spring 66. In the event of hose separation, product flowing from the storage tank SST will be checked by the back check valve 22 which is installed in the downstream end of the flexible hose system.

The locking piston return spring 54 may be sized to require hose pressure at a desired level, typically from 10 psi to 100 psi, to move the locking piston 36 to the locked or open flow position. A preferred pressure is from 15 psi to 50 psi, and preferably from about 20 psi to about 40 psi. In some situations, the ambient temperature will allow the system pressure to be less than the selected locking piston pressure, e.g., 30 psi. For anhydrous ammonia, the system pressure will thus be less than 30 psi at about 10° Fahrenheit ambient temperature. In the case that the pressure in the sensing line 26 is not sufficient to hold the piston 36 in the locked position, valve member 62 may be held open, as shown in FIG. 5, while the power take off PTO is engaged on the transport vehicle with the outlet valve TOV open and the valve RTV closed. This will allow the pump P on the transport vehicle to generate sufficient pressure within the flexible hose 16 to move the piston 36 to the lock position, thereby locking the back check assembly 20 in the opened position and permitting the release of the cam 76 and the return of the handle 72 to the release position. The operator may then slowly open the valve RTV to initiate transfer of the product.

Figure 8:
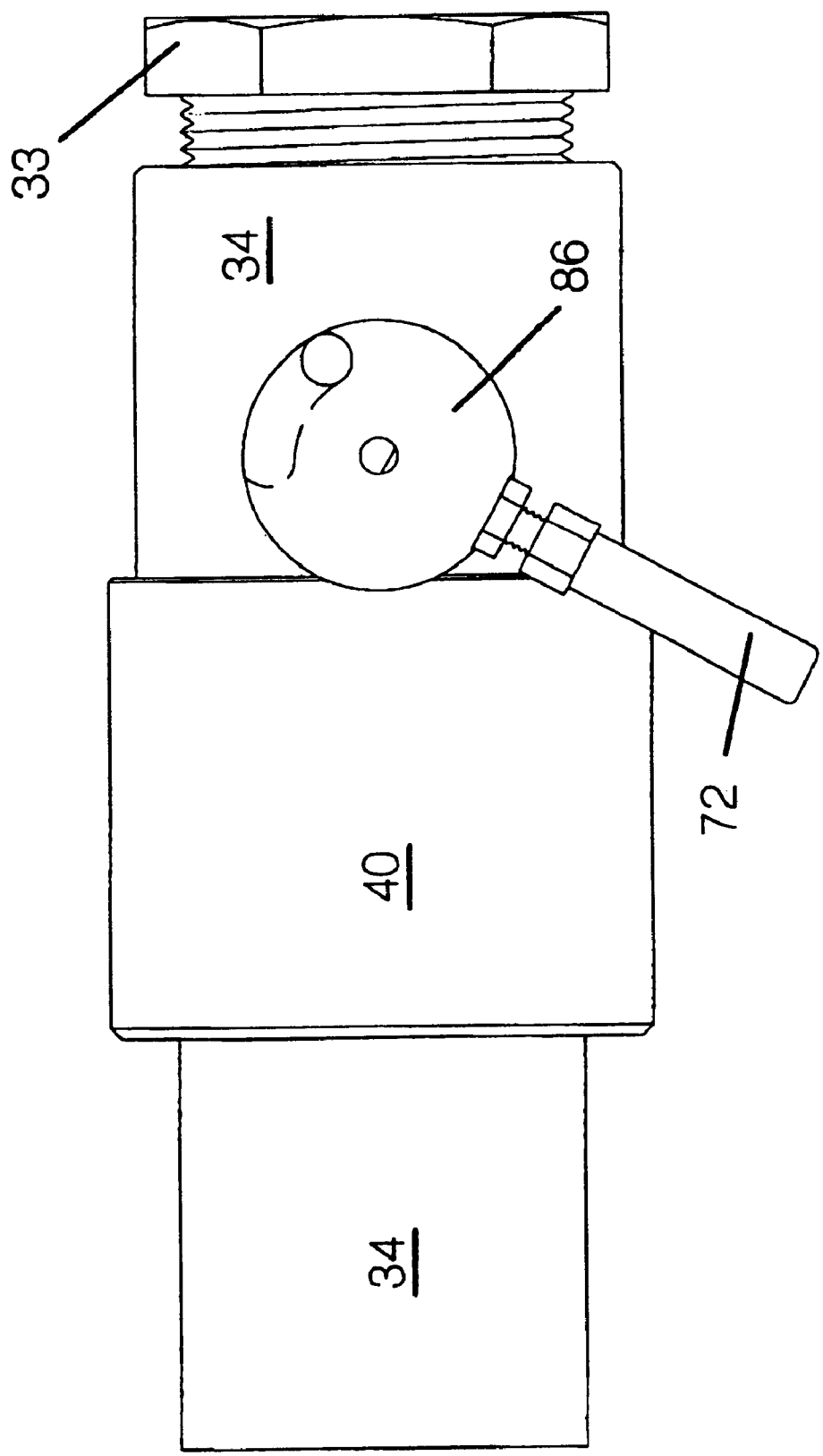
FIG. 8 is a simplified top view of the assembly shown in FIG. 7.

As shown in FIG. 5, the positioning cam 74 is preferably designed so that a locking handle 72 cannot be moved to a position wherein the cam 74 is maintained in the open position without manual intervention. In other words, the profile of the cam 74 as shown in FIG. 5 and a maximum rotation of the handle 72 relative the slot 88 as shown in FIG. 8 prevent the cam from holding the valve 56 in the open position without torque being manually applied to the handle 72. Any time the operator lets go of the cam handle 72, the valve 56 will be biased closed by the spring 66 and the normal flow of fluid through the flexible hose system, unless the piston 36 is first moved to its locked position in response to fluid pressure within the flexible hose 16. This safety feature of the flexible hose system insures its proper operation by the operator.

Figure 7:
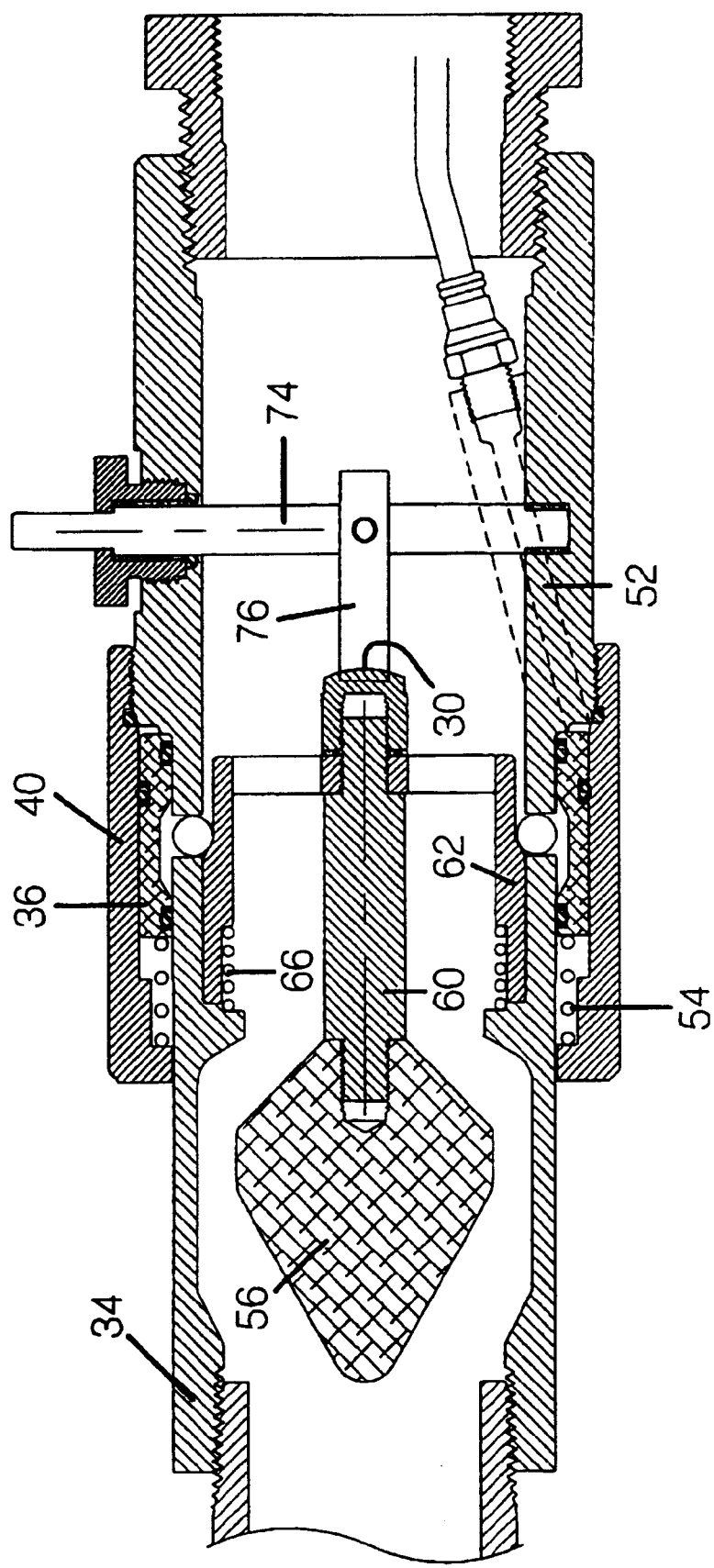
FIG. 7 illustrates the back check valve held in the open flow position by the manual lever.

FIGS. 7 and 8 show the actuator handle 72 positioned so that the cam 76 manually opens the back check assembly 20 and unseats the valve member 56 from the seat 58. Since the pressure in the flexible hose 16 is insufficient to overcome the biasing force of the spring 54, the piston 36 is in the unlocked position. To open the back check assembly 20, the actuator handle must be maintained in the position as shown in FIG. 8, since the release of the actuator handle will automatically allow the back check assembly to move to the closed position, as shown in FIG. 6. When held in the open position by the actuator handle 72, as shown in FIGS. 7 and 8, fluid pressure may be increased in the flexible hose 16 either by opening the TOV, or by opening the TOV, closing the RTV and activating the pump P, to cause the piston 36 to move to the locked position, as shown in FIG. 2, thereby preventing the valve member 56 from closing until fluid pressure in the flexible hose 16 drops below a selected value. When the fluid transfer is complete, the pump P may be deactivated, the TOV closed, then the RTV closed. The hammer union 12 may then be knocked open slightly to permit venting of fluid trapped in the transfer hose. When the internal hose pressure drops below the set pressure, valve 56 will close. To fully vent the hose, handle 72 may be operated to manually open valve 56, which completes the venting. It is also important that after every use, a check for resistance when operating handle 72 will confirm that valve 56 is in fact closed on hose bleeddown, which is an operational check of the device. If there is no or very little resistance to movement the handle 72, the operator will know that the valve member 56 has improperly locked open. The flexible hose assembly may then be safely disconnected from both the TOV and the RTV, and may then be transported with the portable transport vehicle for use in a subsequent on-loading or off-loading operation.

Various configurations for the back check valve 56 and the sleeve 62 may be used according to the present invention. In a preferred embodiment, three circumferentially spaced locking balls 68 are provided at 120° intervals, although various mechanisms for retaining the sleeve 62 and thus a valve member 56 in the open position may be used which cooperate with the axial position of a locking piston 36. The valve member, the piston, the sleeve, the positioning cam, and other components of the flexible hose system may have modified configurations while still serving the purpose of the components disclosed for a preferred embodiment.

In the embodiment discussed above, both the valve member and the piston are biased to stop flow through the back check assembly. If the piston and the valve member were directly connected, the biasing force could be provided on either the valve member or the piston. Trip mechanisms other than the radial ball style shown may also be feasible.

While preferred embodiments of the present invention have been illustrated in detail, it is apparent that modifications and adaptations of the preferred embodiments will occur to those skilled in the art. However, it is to be expressly understood that such modifications and adaptations are within the spirit and scope of the present invention as set forth in the following claims.

What is claimed:

1. A flexible hose assembly interconnecting a portable tank with another tank using a flexible hose and transmitting fluids between the portable tank and the another tank, the flexible hose assembly comprising:

a back check housing containing a valve member and a seating surface for closing off flow through the back check housing, the back check housing being positioned at an upstream end of the flexible hose;

a piston interconnected with the back check housing and axially movable between a locked position and an unlocked position, the piston and valve member being connected such that the valve member is in the open flow position when the piston is in the locked position, and the valve member is allowed to move to the closed flow position against the seat when the piston is in the unlocked position;

a flexible sensing line extending downstream from the back check housing for transmitting fluid pressure from within the hose to the piston to move the piston to the locked position; and a biasing member for biasing at least one of the piston and the valve member to the unlocked position.

2. The flexible hose assembly as defined in claim 1, further comprising:

a check valve positioned in a downstream portion of the flexible hose assembly for preventing fluid flow from a receiving vessel back to the flexible hose.

3. The flexible hose assembly as defined in claim 1, further comprising:

the valve member being positioned upstream from the seat; and the biasing member includes a spring for biasing the valve member toward engagement with the seat.

4. The flexible hose assembly as defined in claim 1, further comprising:

the valve member being positioned on a valve stem; and a ported sleeve member for engaging the valve stem and movably positioning the valve stem and the valve member within the back check housing.

5. The flexible hose assembly as defined in claim 1, further comprising:

a cam member selectively operable for moving the valve member to the open flow position.

6. The flexible hose assembly as defined in claim 5, further comprising:

the cam member being provided on a shaft;

a handle for rotating the shaft; and the cam member and shaft cooperating to prevent the cam member from maintaining the valve member out of sealing engagement with the seat unless a torqueing force is applied to the shaft by the handle.

7. The flexible hose assembly as defined in claim 1, further comprising:

a plurality of ball members for cooperating with the piston to maintain the valve member open when the piston is in the locked position and for allowing the valve member to move to the closed position when the piston is in the unlocked position.

8. The flexible hose assembly as defined in claim 1, further comprising:

a single axis fluid passageway in the housing for transmitting fluid pressure from the sensing line to the piston.

9. The flexible hose assembly as defined in claim 1, wherein the flexible sensing line is positioned within the flexible hose and a downstream end of the flexible sensing line is positioned within a downstream portion of the flexible hose assembly, such that pressure in the downstream portion of the flexible hose assembly moves the piston to the locked position.

10. A method of interconnecting a portable tank with another tank and transmitting hazardous fluids between the portable tank and the another tank, the method comprising:

providing a back housing containing a valve member and a seating surface for closing off flow through the back check housing;

providing a flexible hose extending downstream from the back check housing;

providing a piston movable between a locked position and an unlocked position, the piston being responsive to pressure in a sensing line extending downstream from the valve member; and connecting the valve member and the piston such that the valve member is in the open flow position when the piston is in the locked position, and low fluid pressure within the sensing line allows the piston to move to the unlocked position to release the valve member to the closed flow position.

11. The method as defined in claim 10, further comprising:

biasing the piston to the unlocked position; and biasing the valve member to the closed flow position.

12. The method as defined in claim 10, further comprising:

positioning a check valve in a downstream portion of the flexible hose assembly to prevent fluid flow back through the flexible hose.

13. The method as defined in claim 10, further comprising:

manually positioning the valve member in the open flow position while fluid pressure is increased in the flexible hose; and releasing the valve member after the piston has moved to the locked position.

14. The method as defined in claim 13, further comprising:

providing a cam member on a shaft; and manually rotating the shaft to position the valve member in the open flow position.

15. The method as defined in claim 14, wherein the cam member and the shaft cooperate to prevent the cam member from holding the valve member in the open flow position in the absence of applied torque to the shaft.

16. The method as defined in claim 10, further comprising:

positioning a downstream end of the sensing line within the downstream portion of the flexible hose assembly, such that pressure in the downstream portion of the flexible hose assembly biases the piston to the locked position.

17. A flexible hose assembly interconnecting a portable tank with another tank and transmitting hazardous fluids between the portable tank and the another tank, the flexible hose assembly comprising:

a back check housing containing a valve member and a seating surface for closing off flow through the back check housing;

a piston interconnected with the back check housing and axially movable between a locked position and an unlocked position, the piston and valve member being connected such that the valve member is in the open flow position when the piston is in the locked position, and the valve member is allowed to move to the closed flow position against the seat when the piston is in the unlocked position;

a sensing line extending downstream from the valve member for transmitting fluid pressure to the piston to move the piston to the unlocked position; and a biasing member for biasing at least one of the piston and the valve member to the unlocked position.

18. The flexible hose assembly as defined in claim 17, wherein the sensing line is positioned at least partially within the back check housing.

19. The flexible hose assembly as defined in claim 17, wherein the sensing line includes a flexible conduit extending downstream from the back check housing.

20. The flexible hose assembly as defined in claim 19, wherein the flexible line extends downstream from the back check housing to a downstream portion of the flexible hose assembly.

* * * * *